No. 743,868. PATENTED NOV. 10, 1903.
J. W. HEATON.
STACKER.
APPLICATION FILED NOV. 20, 1902.
NO MODEL. 2 SHEETS—SHEET 2.

Witnesses;
John B Sherwood
S Mahlon Unger

Inventor,
John W. Heaton,
By Joseph A Minturn,
Attorney,

No. 743,868. Patented November 10, 1903.

UNITED STATES PATENT OFFICE.

JOHN W. HEATON, OF INDIANAPOLIS, INDIANA, ASSIGNOR OF ONE-HALF TO IRWIN EUGENE HOLMES, OF INDIANAPOLIS, INDIANA.

STACKER.

SPECIFICATION forming part of Letters Patent No. 743,868, dated November 10, 1903.

Application filed November 20, 1902. Serial No. 132,067. (No model.)

*To all whom it may concern:*

Be it known that I, JOHN W. HEATON, a citizen of the United States, residing at Indianapolis, in the county of Marion and State of Indiana, have invented certain new and useful Improvements in Stackers, of which the following is a specification.

This invention relates to improvements in separators, clover-hullers, and the like, and has special reference to the means for conveying the straw or other like material away from the machine and depositing it in stacks.

The object of the invention is to provide a telescoping tubular discharge with an adjustable hood or terminal embodying and carrying out in a practical manner the application of compressed air at or near the end of the tube to draw the straw through the tube by suction, as provided in my Patent No. 711,964, issued October 28, 1902.

Figure 1:
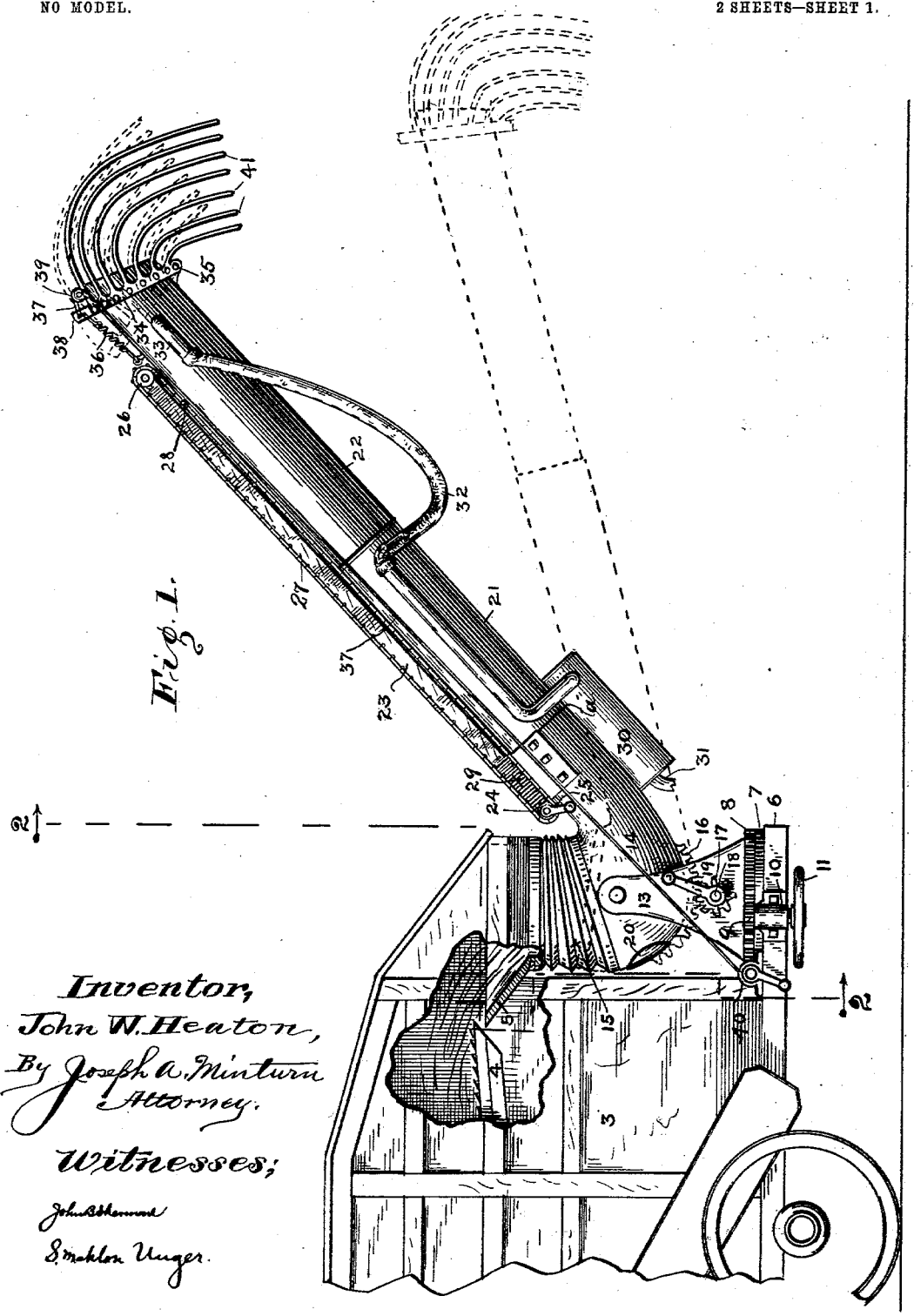
Figure 2:
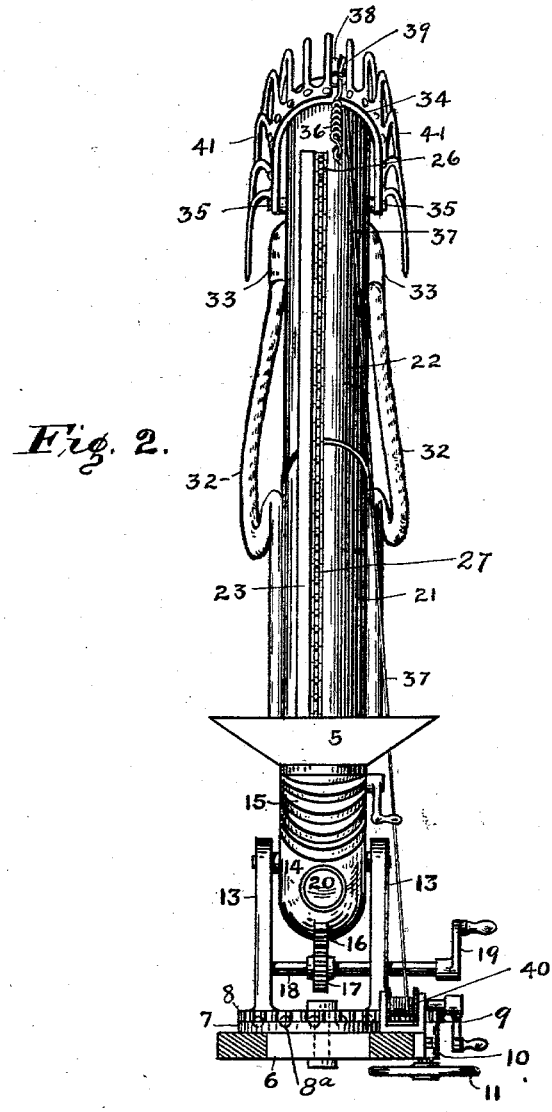

Referring to the accompanying drawings, in which like characters indicate like parts, Figure 1 is a side elevation of my invention in operative position on a separator, and Fig. 2 is a view in the direction of the arrows from the line 2 2 of Fig. 1.

3 is a separator of any usual or well-known construction, and 4 the riddles from which the straw is discharged into the hopper 5, secured in a fixed manner to the frame of the machine under the discharge end of said riddles.

Mounted on a suitable lower platform 6 of the separator-body is the base-plate 7, upon which is the circular plate 8, which is centrally pivoted to the plate 7. The plate 8 rests on balls 8ª and has peripheral cogs which are engaged by the cogs of a pinion 9 of a short vertical shaft mounted in a suitable box 10, supported by the side of platform 6. The lower shaft end has the hand-wheel 11, by which the pinion is rotated to rotate the plate 8. The latter has the two parallel standards 13 13, between the upper ends of which the tubular discharge or chute is pivotally mounted. The lower or inner end 14 of this chute is curved to provide a lateral inlet, and this inlet is connected by an expansible portion 15, of air-tight construction, like the sides of a bellows, which allows for the vertical adjustment of the chute on the above-mentioned pivots. A toothed rack 16 on the under side of the curved end of the part 14 is engaged by the teeth of pinion 17 on shaft 18. The latter shaft, being supported by the standards 13 and provided with the crank 19, provides means for vertically adjusting the part 14. The latter will have the manhole 20 for ready access to the interior in case of clogging or other occurrence making such access desirable. The said part 14, terminating at the line *a*, will preferably be made of cast-iron to insure rigidity and strength, although other material may be used, and the section 21 of the chute will be secured to the outer or end *a* of said cast portion. An outer section 22 of the chute will telescope over the section 21. Secured in a firm and substantial manner to the part 14 is a bar 23, having the sprocket-wheel 24 and crank 25 mounted on a shaft at its lower end and a sprocket-wheel 26 mounted at the upper end of said bar. These two sprocket-wheels are connected by the endless link belt 27, which is secured at 28 to the outer section 22 of the chute. By turning the crank 25 the outer section of the chute will be moved out or in, depending on the direction in which the crank is turned. Preferably the attachment of the bar with the section 14 will be by means of an iron socket 29, bolted to section 14, in which socket the end of the bar 23 is removably placed, and the section 21 of the chute will preferably be removably secured in a like manner to the part 14 at *a*, whereby said bar and outer members of the chute may be disconnected and placed upon the top of the separator for transportation or storage.

The expansible or bellows portion 15 will be annular in shape and connected with an annular flange on the outlet of the funnel or hopper 5, and the joint thus provided will permit of free rotary adjustment of the chute-inlet occasioned by the side movement of the chute in building a stack. These annular rims or flanges have additional interlocking flanges, as shown in Fig. 1, or they may be retained in proper mutual relation by other suitable means.

Located at any convenient part of the separator or stacker mechanism is the tank 30, which is supplied with compressed air through pipe 31 by any suitable means. This tank 30 is connected by pipes 32 32 with the injector-nozzles 33 33, located on opposite sides of the outer section of the chute adjacent to the outer end of said section and discharging compressed air into said chute, so as to create an induced draft or suction upwardly and outwardly through said chute in the manner as described and claimed in my former patent, hereinabove referred to. The direction of the delivery of the straw from the discharge end of the chute is determined by the hood or deflector, as shown, in which the main body portion is an inverted-U-shaped frame or bail 34, which straddles the outer end of the outer section of the chute and is pivoted at its ends at 35 like the bail of a bucket to ears depending from said chute-section. This bail is somewhat larger than the diameter of the chute, so as to allow of a limited swinging adjustment. It is drawn in a downward direction by the spring 36. This is overcome by a cable 37, attached to the top of the bail, or rather to an arm extension 38 therefrom, which passes thence around a pulley 39, located farther out on the chute, and thence back to a windlass 40, mounted on the threshing-machine body in easy reach of an operator on the ground below. The bail or frame 34 has the outwardly-projected and curved prongs or rods 41, which direct the straw issuing from the mouth of the chute without interfering in any way with the free escape of the air associated with it. While I regard this open construction of hood as preferable, I am aware that a solid outer wall would change the direction of the air-current carrying the straw and under some circumstances be preferable. For ordinary and general service I consider that the open formation is the more efficient; but I do not desire to limit my invention to either form.

Having thus fully described my invention, what I claim as new, and wish to secure by Letters Patent, is—

1. In a stacker, a chute pivoted to allow of vertical adjustment of its outer end and having an inlet at or adjacent to its inner end, a fixed hopper to receive from the machine the material to be stacked and an expansible conduit connecting the hopper with the chute-inlet.

2. In a stacker, a hopper through which the material to be stacked must pass, said hopper having an annular outlet, a chute having a lateral inlet adjacent to its inner end, said chute being pivoted to allow of the vertical adjustment of its outer end and also lateral adjustment of said outer end about an axis through the center of said annular hopper-outlet and an expansible conduit connecting the hopper with the inlet to the chute.

3. In a pneumatic stacker, a tube through which the material to be stacked is discharged, a bail pivotally secured at its ends to the lower walls of the chute adjacent to the discharge end of the chute or tube and having a swinging adjustment on said pivots said bail having curved deflectors which project into the path of the discharge to change the direction of the discharge.

4. The combination with a tubular discharge of a bail pivoted at its lower ends to the lower portion of the tube, said bail having curved rods or prongs, a spring to move the bail in a direction to raise the prongs and a cable attached to the bail and passing first around a fixed part on the side of the bail opposite the spring and carried thence in the direction of the spring to the bottom of the tube, and means for reeling up and holding the cable.

5. In a stacker, or expansible conduit a chute pivotally mounted so as to have vertical and lateral adjustments and having an inlet through its upper side connected with said conduit whereby the material to be stacked will be fed downwardly into said chute, said chute being in removable and detachable sections whereby the outer parts may be removed for storage or transportation.

6. In a stacker, a pair of standards mounted on a circular base said base having peripheral cogs and being pivotally secured, a supporting-plate to which said base is secured, ball-bearings between said plate and base, a shaft having a pinion at one end to engage the peripheral cogs of the base, means for rotating the shaft, a chute pivotally secured at its lower end between said standards, said chute being in telescoping sections and having a top side inlet, a fixed hopper over said inlet and expansible connections between the hopper and inlet, an adjustable deflector or hood on the outer end of the chute and means for moving the chute-sections longitudinally of each other to change the length of said chute.

In witness whereof I have hereunto set my hand and seal, at Indianapolis, Indiana, this 13th day of November, A. D. 1902.

JOHN W. HEATON. [L. S.]

Witnesses:
S. MAHLEN UNGER,
JOHN I. SHERWOOD.